(12) United States Patent
Yamamoto et al.

(10) Patent No.: US 10,471,522 B2
(45) Date of Patent: Nov. 12, 2019

(54) DRILL

(71) Applicant: MITSUBISHI MATERIALS CORPORATION, Tokyo (JP)

(72) Inventors: Tadashi Yamamoto, Tokyo (JP); Kazuya Yanagida, Tokyo (JP); Yuya Tsurumaki, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/754,652

(22) PCT Filed: Aug. 29, 2016

(86) PCT No.: PCT/JP2016/075153
§ 371 (c)(1),
(2) Date: Feb. 23, 2018

(87) PCT Pub. No.: WO2017/034038
PCT Pub. Date: Mar. 2, 2017

(65) Prior Publication Data
US 2018/0236568 A1    Aug. 23, 2018

(30) Foreign Application Priority Data

Aug. 27, 2015   (JP) ................... 2015-167868

(51) Int. Cl.
*B23B 51/02* (2006.01)
*B23B 51/06* (2006.01)
*B23B 51/00* (2006.01)

(52) U.S. Cl.
CPC .............. *B23B 51/06* (2013.01); *B23B 51/02* (2013.01); *B23B 51/00* (2013.01);
(Continued)

(58) Field of Classification Search
CPC ..... B23B 51/02; B23B 51/06; B23B 2251/14; B23B 2251/18; Y10T 408/9097; Y10T 408/455
See application file for complete search history.

(56) References Cited

U.S. PATENT DOCUMENTS 4,728,231 A  *  3/1988  Kunimori .............. B23B 51/02
                                                    408/144
4,983,079 A  *  1/1991  Imanaga .................. B23B 51/02
                                                    408/144
(Continued)

FOREIGN PATENT DOCUMENTS

CN    101081483 A    12/2007
CN    101534983 A     9/2009
(Continued)

OTHER PUBLICATIONS

Machine Translation, Japan Patent Document, JP 2005-169572A, Takiguchi, M. Jun. 2005.*
(Continued)

*Primary Examiner* — Eric A. Gates
*Assistant Examiner* — Chwen-Wei Su
(74) *Attorney, Agent, or Firm* — Locke Lord LLP

(57) ABSTRACT

A drill has a thinning rake face formed in the front end. An intersection ridgeline between the thinning rake face and the tip flank face is the thinning edge. On the opposite side of the rotation direction, the first and second thinning wall surfaces (6b, 6c) and are formed. Viewed from the front, an intersection angle between the thinning edge (4a) and the first thinning ridgeline is larger than 95°. The second thinning ridgeline (L2) is bent to the opposite side of the rotation direction. The thinning edge and the first thinning ridgeline are connected via a concave curve line. The first and second thinning wall surfaces are connected via a concave surface,
(Continued)

and a curvature radius of the concave curve line is smaller than a curvature radius of the concave surface.

7 Claims, 4 Drawing Sheets

(52) U.S. Cl.
CPC ....... *B23B 2250/12* (2013.01); *B23B 2251/04* (2013.01); *B23B 2251/082* (2013.01); *B23B 2251/14* (2013.01); *B23B 2251/18* (2013.01); *Y10T 408/455* (2015.01); *Y10T 408/9097* (2015.01)

(56) References Cited

U.S. PATENT DOCUMENTS

| | | | | |
|---|---|---|---|---|
| 5,350,261 | A | * | 9/1994 | Takaya .................... B23B 51/02 408/229 |
| 5,716,172 | A | * | 2/1998 | Nakamura .............. B23B 51/02 408/227 |
| 2009/0279965 | A1 | | 11/2009 | Soittu |
| 2018/0043441 | A1 | * | 2/2018 | Fujiwara ................. B23B 51/02 |

FOREIGN PATENT DOCUMENTS

| | | | |
|---|---|---|---|
| CN | 101574745 | A | 11/2009 |
| JP | 56-052110 | A | 5/1981 |
| JP | 2001079707 | A | 3/2001 |
| JP | 3515167 | B2 | 4/2004 |
| JP | 3515168 | B2 | 4/2004 |
| JP | 2005-001082 | A | 1/2005 |
| JP | 2005-169528 | A | 6/2005 |
| JP | 2005-169572 | A | 6/2005 |
| JP | 2008-137125 | A | 6/2008 |
| JP | 2009-142963 | A | 7/2009 |
| JP | 2009-269167 | A | 11/2009 |
| WO | WO0067939 | A1 * | 11/2000 |
| WO | 2014/116575 | A1 | 7/2014 |

OTHER PUBLICATIONS

International Search Report dated Sep. 20, 2016, issued for PCT/JP2016/075153 and English translation thereof.
Office Action dated Dec. 5, 2018, issued for the Chinese patent application No. 201680048576.2 and English translation thereof.
Japanese Office Action dated Jun. 4, 2019 in JP Application No. 2015-167868.

* cited by examiner

DRILL

TECHNICAL FIELD

The present invention relates to a drill in which a cutting edge having a thinning edge on an inner peripheral portion thereof is formed on a front end portion a drill main body.

Priority is claimed on Japanese Patent Application No. 2015-167868, filed on Aug. 27, 2015, the content of which is incorporated herein by reference.

BACKGROUND ART

For example, as such a drill, the following drills disclosed in PTLs 1 and 2 are suggested, in which thinning is performed on an inner peripheral portion of a cutting edge to form a thinned face, the thinned face is configured of three thinned faces such as a thinned face on which the thinning edge is formed, a thinned face which intersects the thinned face having the thinning edge and faces an outer circumference side of the drill main body, and a thinned face which intersects the thinned face having the thinning edge and faces a side opposite to a drill rotation direction. In such a drill, the heel side of a tip flank face is not removed entirely, a thickness at the tip of the drill main body is secured by the thinned face facing the side opposite to the drill rotation direction, and therefore, strength or rigidity of the drill is improved, a chip contacting length is secured, and favorable chip partibility can be obtained.

CITATION LIST

Patent Literature

[PTL 1] Japanese Patent (Granted) Publication No. 3515167 (B)

[PTL 2] Japanese Patent (Granted) Publication No. 3515168 (B)

SUMMARY OF INVENTION

Technical Problem

Meanwhile, in the drills disclosed in PTLs 1 and 2, an intersection angle between an intersection ridgeline between the thinned face on which the thinning edge is formed and the tip flank face and an intersection ridgeline between the thinned face which is connected to the thinned face having the thinning edge and faces the outer circumference side of the drill main body and the tip flank face is 75° to 95°, an acute angle is approximately a right angle. Accordingly, chips generated by the thinning edge are pressed to the thinned face facing the outer circumference side of the drill main body and stagnate in a narrow space due to thinning, which may cause an increase in cutting resistance. This is particularly noticeable in high efficiency machining due to a high feed rate in recent years, high performance is required for a machine tool, a clamping method of a workpiece is restricted, or the like, and therefore, the use environment of the drill is also restricted.

The present invention is made in consideration of the above-described circumstances, and an object thereof is to provide a drill capable of suppressing an increase in a cutting resistance even in high efficiency machining in recent years.

Solution to Problem

In order to solve the above-described problems and achieve the above-described object, according to an aspect of the present invention, there is provided a drill in which a chip discharge flute which is open to a tip flank face of a drill main body and extends to a rear end side of the drill main body is formed on an outer periphery of a front end portion the drill main body rotating around an axis, and a cutting edge is formed on an intersection ridgeline between a wall surface of the chip discharge flute facing a drill rotation direction and the tip flank face, in which a thinning part is formed on an inner peripheral portion of a tip of the chip discharge flute, a thinning rake face is formed on an inner peripheral portion of a tip of the wall surface facing the drill rotation direction of the chip discharge flute, and a thinning edge which is an inner peripheral portion of the cutting edge is formed on an intersection ridgeline between the thinning rake face and the tip flank face, a first thinning wall surface which is connected to the thinning rake face and faces an outer circumference side of the drill main body and a second thinning wall surface which is connected to the first thinning wall surface and faces a heel side are formed on a wall surface, which faces an opposite side of the drill rotation direction of the chip discharge flute, an intersection ridgeline between the first thinning wall surface and the tip flank face is a first thinning ridgeline, and an intersection ridgeline between the second thinning wall surface and the tip flank face is a second thinning ridgeline, when viewed from a front end side in a direction of the axis, an intersection angle between the thinning edge and the first thinning ridgeline is larger than 95°, and the second thinning ridgeline is bent to the side opposite to the drill rotation direction with respect to the extension line of the first thinning ridgeline toward the outer circumference side of the drill main body, and the thinning edge and the first thinning ridgeline are connected each other via a concave curve line, the first thinning wall surface and the second thinning wall surface are connected each other via a concave surface, and a curvature radius of the concave curve line is smaller than a curvature radius of the concave surface.

In the drill having the above-described configuration, as viewed from a side of the front end in the direction of the axis, first, the intersection angle between the thinning edge and the first thinning ridgeline which is the intersection ridgeline between the first thinning rake face which is connected to the thinning rake face on which the thinning edge is formed and faces the outer circumference side of the drill main body and the tip flank face is an obtuse angle which is an angle larger than 95°. Therefore, a wide volume of the thinning part can be secured, the chip generated by the thinning edge is smoothly discharged without being pressed to the first thinning wall surface, and it is possible to decrease a cutting resistance. In addition, in general, in a drill in which the cutting edges are disposed at equal intervals in a circumferential direction, the intersection angle is not larger than an angle obtained by dividing 360° by the number of the cutting edges, and for example, in a general drill having two edges, the intersection angle does not exceed 180°.

Moreover, as viewed from a side of the front end in the direction of the axis, the second thinning ridgeline which is the intersection ridgeline between the second thinning wall surface which is connected to the first thinning wall surface and faces the heel side and the tip flank face is bent to the side opposite to the drill rotation direction with respect to the extension line of the first thinning ridgeline toward the outer circumference side of the drill main body. Therefore, as described above, the thickness of the tip of the drill main body with respect to the heel side is maintained even when the thinning part is widened, and therefore, it is possible to secure the rigidity of the drill main body. In addition, the thinning edge and the first thinning ridgeline are connected each other via the concave curve line, the first and second thinning wall surfaces are connected each other via the concave surface, and therefore, unlike a case where these intersect each other at an angle, there is little risk of cracks occurring from the intersections.

In addition, the curvature radius of the concave curve line connecting the thinning edge and the first thinning ridgeline to each other is smaller than the curvature radius of the concave surface connecting the first thinning wall surface and the second thinning wall surface. Therefore, it is possible to improve biting or cutting on an inner peripheral end of the thinning edge on the tip of the cutting edge positioned in the vicinity of the axis to decrease a thrust load, and it is possible to further decrease the cutting resistance. Meanwhile, even when a chip having a curled portion of a small radius is generated by the inner peripheral end of the thinning edge, the curvature radius of the concave surface connecting the first thinning wall surface and the second thinning wall surface increases, and therefore, jamming and clogging of the chip do not occur.

In addition, as viewed from a side of the front end in the direction of the axis, the extension line of the second thinning ridgeline toward the inner peripheral side of the drill main body is formed to intersect the extension line of the thinning edge. Accordingly, for example, even in a case where the second thinning ridgeline and the thinning edge are parallel to each other or the extension line of the second thinning ridgeline toward the outer circumference side of the drill main body intersects the extension line of the thinning edge, the thinning part increases on the outer circumference side of the drill main body, and therefore, it is possible to promote the smooth discharging of the chip.

In addition, by having a configuration in that as viewed from a side of the front end in the direction of the axis, a diameter of a circle, which is in contact with a third thinning ridgeline that is an intersection ridgeline of extension faces of the first thinning wall surface and the second thinning wall surface and has a center corresponding to a location of the axis, is set to within a range of 0.02×D to 0.6×D with respect to an outer diameter D of the cutting edge, the strength or the rigidity of the drill main body can be sufficiently secured while the smooth discharging of the chip is reliably maintained as explained above. That is, if the diameter of the circle is smaller than 0.02×D, the width of the first thinning wall surface decreases, and therefore, there is a concern that the chips cannot be smoothly discharged. Conversely, if the diameter of the circle is larger than 0.6×D, the front end portion the drill main body is largely removed by the first thinning wall surface, and therefore, there is a concern that the strength or the rigidity may be deteriorated.

Moreover, in a case where a coolant hole has an opening on the tip flank face, at least one of the first thinning ridgeline and the second thinning ridgeline intersects the opening of the coolant hole. Accordingly, a coolant discharged from the coolant hole can be effectively supplied to the thinning part, it is possible to improve lubricating effects or cooling effects of the cutting edge including the thinning edge, and it is possible to obtain more favorable discharge properties of the chip.

Advantageous Effects of Invention

As described above, according to the drill of an aspect of the present invention, the strength or the rigidity of the front end portion the drill main body is maintained to lengthen the life span of the drill, and particularly, the chips generated by the thinning edge can be smoothly discharged, the cutting resistance decreases even in high efficiency machining, and stable drilling can be performed.

DESCRIPTION OF EMBODIMENTS

Figure 1:
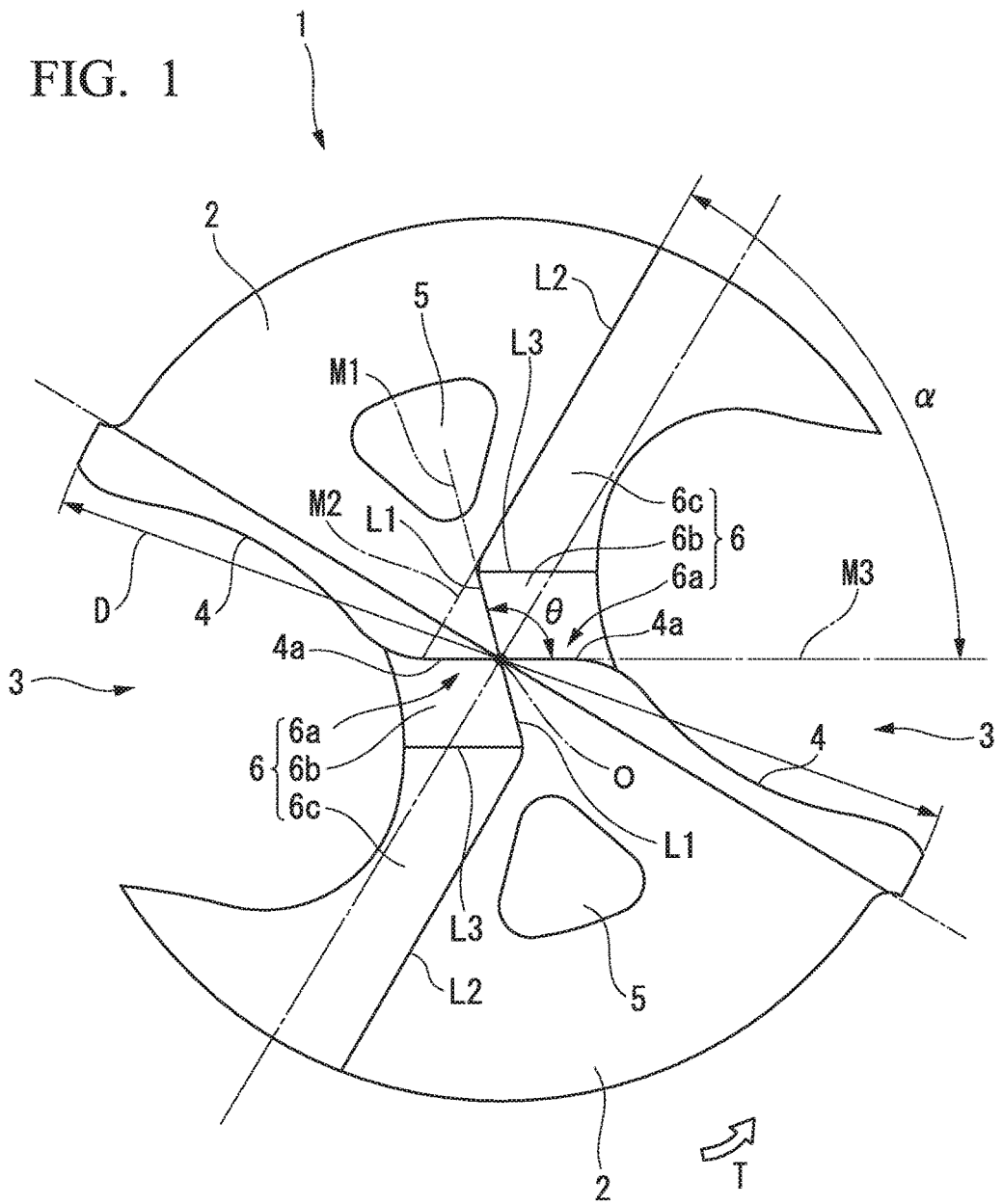
FIG. 1 is a front view as the drill main body showing the first embodiment of the present invention is viewed from the front end side in the direction of the axis.
Figure 2:
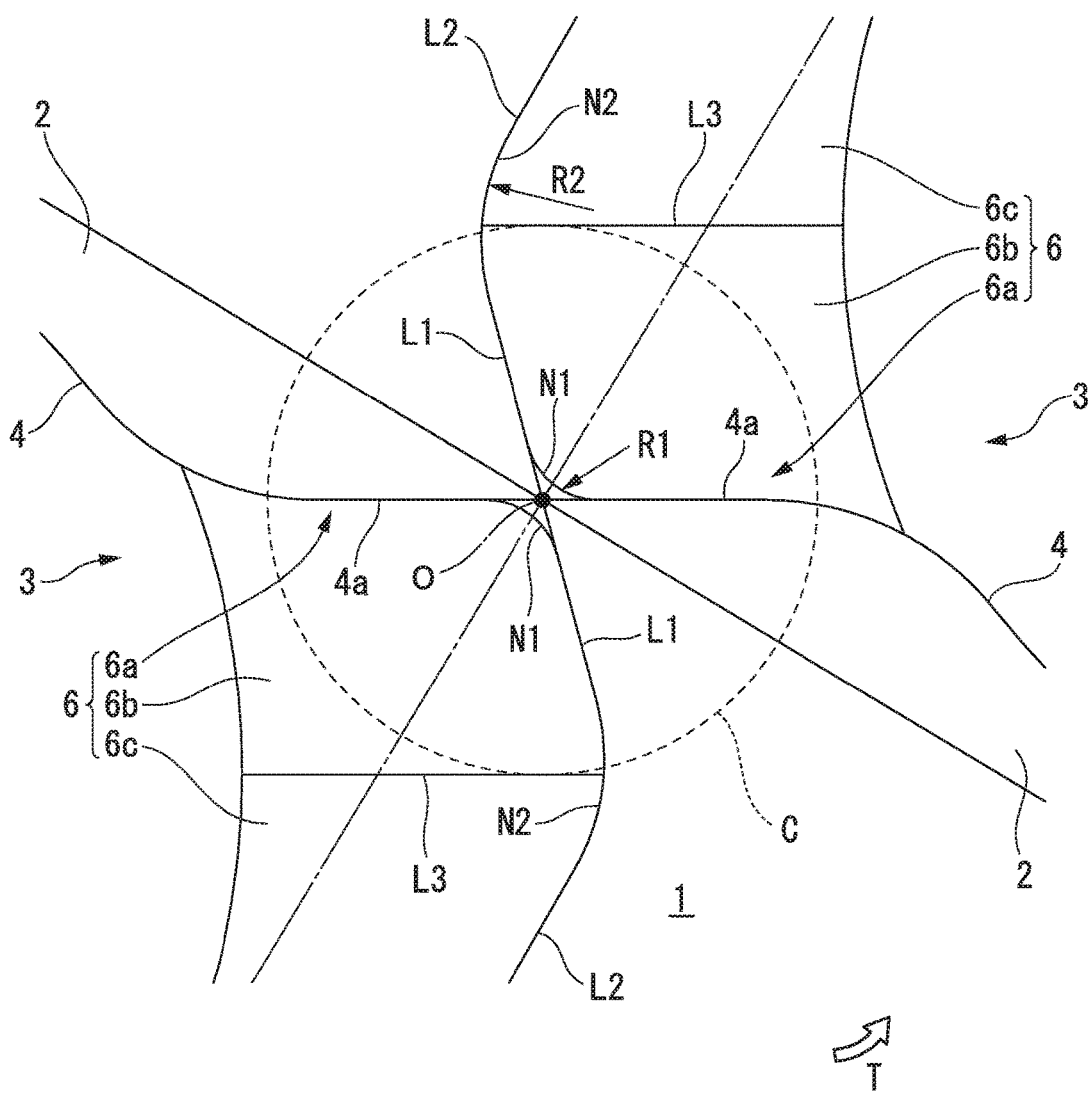
FIG. 2 is an enlarged front view in the vicinity of the axis of the embodiment shown in FIG. 1.

FIGS. 1 and 2 show the first embodiment of the present invention. In the present embodiment and second and third embodiments described later, a drill main body 1 is made of a hard material such as cemented carbide as a substantially column shape with an axis O as a center, a rear end portion (not shown) of the drill main body 1 is a shank portion in which a column shape is maintained, and chip discharge flutes 3 which are open to tip flank faces 2 on the front end of the drill 1 and extend to the rear end side are formed on the outer circumference of the front end portion. In the drill, the shank portion is gripped by a main shaft of a machine tool and is fed to the front end side in the direction of the axis O while being rotated in the drill rotation direction T about the axis O, and drilling is performed on a metal material such as a steel material by cutting edges 4 formed on intersection ridgelines between wall surfaces of the chip discharge flutes 3 facing the drill rotation direction T and the tip flank faces 2.

In the present embodiment, a twist drill having two edges in which two chip discharge flutes 3 are formed on the outer circumference of the front end portion the drill main body 1 so as to be twisted to the side opposite to the drill rotation direction T toward the rear end side, and a pair of cutting edges 4 are formed on the intersection ridgelines between the wall surfaces of the chip discharge flutes 3 facing the drill rotation direction T and the tip flank faces 2. In addition, in the drill main body 1, a pair of coolant holes 5 is formed so as to be twisted between the two chip discharge flutes 3 in a circumferential direction from a rear end surface (a rear end surface of the shank portion) of the drill main body 1 toward the front end side and is open to the tip flank face 2, and the pair of coolant holes 5, the two chip discharge flute 3, the pair of cutting edges 4, the tip flank faces 2 connected to the side opposite to the drill rotation direction T, and thinning parts 6 described later are disposed 180° rotationally symmetrical with respect to the axis O.

The thinning part 6 is formed on an inner peripheral portion of a front end of each chip discharge flute 3 to remove the inner peripheral portion of the chip discharge flute 3 from the wall surface the chip discharge flute 3 facing the drill rotation direction T of toward a wall surface facing the side opposite to the drill rotation direction T, the surface obtained by removing the wall surface of the chip discharge flute 3 facing the drill rotation direction T becomes a thinning rake face 6a, and a thinning edge 4a configuring the inner peripheral portion of the cutting edge 4 is formed on an intersection ridgeline of the thinning rake face 6a and the tip flank face 2. In the present embodiment, the thinning rake face 6a formed in an approximately flat surface, and the thinning edge 4a is formed in an approximately linear shape as viewed from the side of the front end in the direction of the axis O.

Moreover, as viewed from the side of the front end in the direction of the axis O, from the thinning edge 4a toward the outer circumference side of the drill main body 1, the cutting edge 4 is formed in a convex curve line which is in contact with the linear thinning edge 4a and is convex in the drill rotation direction T, and thereafter, the cutting edge 4 is formed in a concave curve line which is in contact with the convex curve line and is concave to the side opposite to the drill rotation direction T, is formed in a convex curve line which is in contact with the concave curve line on the outer circumference side of the drill main body 1 and is convex in the drill rotation direction T again, and intersects a margin portion on the outer circumference of the drill main body 1 at an obtuse angle. In addition, the tip flank face 2 is configured of a plurality of stages (two stages in the present embodiment) of flank faces in which a relief angle increases toward the side opposite to the drill rotation direction T, and the coolant hole 5 is open to the second stage having a larger area.

In each thinning part 6, the first thinning wall surface 6b which is connected to the thinning rake face 6a and faces the outer circumference side of the drill main body 1 and the second thinning wall surface 6c which is connected to the first thinning wall surface 6b and faces the heel side of the front end of the drill main body 1 are formed on the wall surface facing the side of the chip discharge flute 3 opposite to the drill rotation direction T, and the second thinning wall surface 6c reaches an outer circumferential surface (a second outer circumference boy clearance surface) of the front end portion the drill main body 1. The first thinning wall surface 6b is inclined to the rear end side of the drill main body 1 toward the outer circumference side of the drill main body 1, and the second thinning wall surface 6c is inclined to the rear end side of the drill main body 1 toward the side opposite to the drill rotation direction T.

In addition, an intersection ridgeline portion between the first thinning wall surface 6b and the thinning rake face 6a and an intersection ridgeline portion between the first and second thinning wall surfaces 6b and 6c are formed in a concave surface such as a concave arc surface which is in contact with the thinning rake face 6a and the first and second thinning wall surfaces 6b and 6c, and except for the intersection ridgeline portions, the first and second thinning wall surfaces 6b and 6c are formed in a planar shape. The intersection ridgeline between the planar portion of the first thinning wall surface 6b and the tip flank face 2 becomes the first thinning ridgeline L1, the intersection ridgeline between the planar portion of the second thinning wall surface 6c and the tip flank face 2 becomes the second thinning ridgeline L2, and each of the first and second thinning ridgelines L1 and L2 is formed in a linear shape as viewed from a side of the front end in the direction of the axis O.

In addition, as viewed from a side of the front end in the direction of the axis O, an intersection angle θ between the thinning edge 4a and the first thinning ridgeline L1 becomes an angle larger than 95°. However, in the present embodiment which is the drill having two edges, the intersection angle θ does not exceed 180°. In addition, the second thinning ridgeline L2 is bent to the side opposite to the drill rotation direction T with respect to the extension line M1 of the first thinning ridgeline L1 toward the outer circumference side of the drill main body 1, and the second thinning wall surface 6c extends in a direction in which the second thinning wall surface 6c intersects the first thinning wall surface 6b at an obtuse angle.

In addition, as described above, each of the intersection ridgeline portion between the first thinning wall surface 6b and the thinning rake face 6a and the intersection ridgeline portion between the first and second thinning wall surfaces 6b and 6c is formed in a concave surface shape, and the thinning edge 4a and the first thinning ridgeline L1 are connected each other and the first and second thinning ridgelines L1 and L2 are connected each other via first and second concave curve lines N1 and N2 each having a concave arc shape or the like as shown FIG. 2. In addition, the curvature radius (the radius of the concave arc) R1 of the first concave curve line N1 which connects the thinning edge 4a and the first thinning ridgeline L1 to each other is set to be smaller than the curvature radius (the radius of a concave arc) R2 of the second concave curve line N2 which connects the first and second thinning ridgelines L1 and L2.

In addition, in the present embodiment, as described above, the second thinning wall surface 6c extends in the direction in which the second thinning wall surface 6c intersects the first thinning wall surface 6b at an obtuse angle, and as shown in FIG. 1, as viewed from a side of the front end in the direction of the axis O, the extension line M2 of the second thinning ridgeline L2 extending toward the inner peripheral side of the drill main body 1 intersects the extension line M3 (in FIG. 1, on the thinning edge 4a on a side opposite to the thinning edge 4a to which the second thinning ridgeline L2 is continuous via the first thinning ridgeline L1) of the thinning edge 4a as the second thinning ridgeline L2 is bent to the side opposite to the drill rotation direction T with respect to the extension line M1 of the first thinning ridgeline L1 toward the outer circumference side of the drill main body 1.

That is, the extension line M2 of the second thinning ridgeline L2 extending toward the inner peripheral side of the drill main body 1 and the extension line M3 of the thinning edge 4a are parallel to each other, or the extension line of the second thinning ridgeline L2 toward the outer circumference side of the drill main body 1 does not intersect the extension line M3 of the thinning edge 4a. In a case where the extension line M2 of the second thinning ridgeline L2 and the extension line M3 of the thinning edge 4a are parallel to each other, an intersection angle indicated by the reference symbol α in FIG. 1 between the extension line M2 and the extension line M3 is set to 0°, and when a direction in which the extension line M2 is inclined in the drill rotation direction T with respect to the extension line M3 is set to a positive, the intersection angle is a positive angle.

However, the second thinning ridgeline L2 is bent to the side opposite to the drill rotation direction T with respect to the extension line of the first thinning ridgeline L1 toward the outer circumference side of the drill main body 1, and therefore, each of the first and second thinning ridgelines L1 and L2 is formed in a linear shape, or the intersection angle between the first and second thinning ridgelines L1 and L2 does not become 180° or more. Moreover, in the present embodiment, the extension line M2 of the second thinning ridgeline L2 extending to the inner peripheral side of the drill main body 1 is approximately orthogonal to the intersection ridgeline between the first stage flank face and the second stage flank face in the tip flank face 2 configured of the plurality of stages of flank faces as described above.

In addition, in the present embodiment, in a case where an intersection ridgeline between the extension faces of the planar first and second thinning wall surfaces 6b and 6c connected to each other via the concave surface is defined as the third thinning ridgeline L3, as shown in FIG. 2, as viewed from a side of the front end in the direction of the axis O, the diameter of a circle C which is in contact with the third thinning ridgeline L3 and has the axis O as a center is set to the range of 0.02×D to 0.6×D with respect to the outer diameter (a diameter of a circle formed by a rotation locus of an outer peripheral end of the cutting edge 4 around the axis O) D of the cutting edge 4. In addition, as shown in FIG. 2, as viewed from a side of the front end in the direction of the axis O, the third thinning ridgeline L3 is approximately parallel to the thinning edge 4a.

Moreover, in the present embodiment, the first and second thinning ridgelines L1 and L2 do not intersect the opening of the coolant hole 5 on the tip flank face 2, and the second thinning ridgeline L2 is formed to extend to the side opposite to the drill rotation direction T of the opening. More specifically, as shown in FIG. 1, in the present embodiment, the extension line M1 of the first thinning ridgeline L1 toward the outer circumference side of the drill main body 1 intersects the opening of the coolant hole 5, and the first thinning wall surface 6b and the first thinning ridgeline L1 are positioned on the inner peripheral side of the drill main body 1 with respect to the opening.

In the drill having the above-described configuration, first, the intersection angle θ between the thinning edge 4a and the first thinning ridgeline L1 connected to the thinning edge 4a is an obtuse angle which is an angle larger than 95° as viewed from a side of the front end in the direction of the axis O, a wide volume of the thinning part 6 can be secured, chips generated by the thinning edge 4a can be smoothly discharged, the chips can be discharged without being pressed to the first thinning wall surface 6b, and it is possible to decrease a cutting resistance. In addition, in the drill having two edges as the present embodiment, as described above, the intersection angle θ is less than 180°, preferably, 150° or less, and more preferably, 100° to 130°.

Moreover, as viewed from a side of the front end in the direction of the axis O, the second thinning ridgeline L2 connected to the first thinning ridgeline L1 is bent to the side opposite to the drill rotation direction T with respect to the extension line M1 of the first thinning ridgeline L1 toward the outer circumference side of the drill main body 1, and therefore, on the outer circumference side of the drill main body 1 of the thinning part 6, the second thinning wall surface 6c connected to the second thinning ridgeline L2 extends toward the heel side in the direction intersecting the first thinning wall surface 6b at an obtuse angle. Accordingly, as described above, the thinning part 6 having a large volume is secured by the first thinning wall surface 6b in the vicinity of the thinning edge 4a, the thickness of the drill main body 1 is maintained on the outer periphery of the front end portion the drill main body 1 to improve strength or rigidity, and it is possible to prevent damage of the drill main body 1 even in the high efficiency machining.

Moreover, in the drill having the above-described configuration, as described above, each of the intersection ridgeline portion between the thinning rake face 6a and the first thinning wall surface 6b and the intersection ridgeline portion between the first and second thinning wall surfaces 6b and 6c is formed in a concave surface shape, the thinning edge 4a and the first thinning ridgeline L1 are connected to each other by the first concave curve line N1, and in the present embodiment, the first and second thinning ridgelines L1 and L2 are connected to each other by the second concave curve line N2. Accordingly, unlike a case where these intersect each other at an angle, there is little risk of cracks occurring in the drill main body 1 from the intersections. Accordingly, it is possible to further lengthen the lifespan of the drill.

In addition, the curvature radius (the radius of the concave arc) R1 of the first concave curve line N1 is set to be smaller than the curvature radius (the radius of the concave arc) R2 of the second concave curve line N2, and therefore, the curvature radius R1 of the first concave curve line N1 is smaller than the curvature radius of the concave surface which connects the intersection ridgeline portions between the first and second thinning wall surfaces 6b and 6c. Therefore, in an inner peripheral end of the thinning edge 4a positioned very close to the axis O, it is possible to improve biting or cutting with respect to a working material by the first concave curve line N1 having a smaller curvature radius R1, a thrust load applied to the rear end side in the direction of the axis O decreases during drilling, and it is possible to further decrease the cutting resistance.

Meanwhile, the curvature radius R2 of the second concave curve line N2 and the curvature radius of the concave surface which connects the intersection ridgeline portions between the first and second thinning wall surfaces 6b and 6c are larger than the curvature radius R1 of the first concave curve line N1, and therefore, for example, as described above, even when a chip having a curled portion of a small radius is generated by the first concave curve line N1 of the inner peripheral end of the thinning edge 4a, the chip is not caught on the concave surface connecting the first and second thinning wall surfaces 6b and 6c to each other, and therefore, clogging does not occur.

Moreover, in order to obtain the above-described effects while preventing chipping or the like at the inner peripheral end of the thinning edge 4a, it is preferable that the curvature radius R1 is within the range of 0.01×D to 0.05×D with respect to the outer diameter D of the cutting edge 4. In addition, in order to prevent a decrease in the volume of the thinning part 6 while preventing jamming of the chips, it is preferable that the curvature radius R2 is within the range of 0.03×D to 0.15×D and R1<R2 is satisfied.

Moreover, in the present embodiment, as viewed from a side of the front end in the direction of the axis O, the extension line M2 of the second thinning ridgeline L2 toward the outer circumference side of the drill main body 1 is formed to intersect the extension line M3 of the thinning edge 4a. Accordingly, for example, the second thinning ridgeline L2 and the thinning edge 4a are parallel to each other, or the extension line of the second thinning ridgeline L2 toward the outer circumference side of the drill main body 1 is formed to intersect the extension line M3 of the thinning edge 4a. That is, even in a case where the intersection angle α is 0° or a negative angle, it is possible to increase the volume of the thinning part 6 on the outer circumference side of the drill main body 1 within a range in which the strength or the rigidity of the drill main body 1 is not damaged, and it is possible to promote the smooth discharging of the chips.

Moreover, in order to reliably obtain the effects, it is preferable that the intersection angle α is 20° to 80°. However, the second thinning ridgeline L2 is bent to the side opposite to the drill rotation direction T with respect to the extension line M1 of the first thinning ridgeline L1 toward the outer circumference side of the drill main body 1, and therefore, the intersection angle α is not larger than the intersection angle θ, that is, α<θ is satisfied.

Moreover, in the present embodiment, as shown in FIG. 2, as viewed from a side of the front end in the direction of the axis O, the diameter of a circle C which is in contact with the third thinning ridgeline L3 which is the intersection ridgeline between the extension faces of the first and second thinning wall surfaces 6b and 6c connected by the concave surface and has the axis O as a center is within the range of 0.02×D to 0.6×D with respect to the outer diameter D of the cutting edge. Meanwhile, if the diameter of the circle C is smaller than 0.02×D, the width of the first thinning wall surface 6b decreases, and therefore, there is a concern that the chips cannot be smoothly discharged. Conversely, if the diameter of the circle C is larger than 0.6×D, the front end portion the drill main body 1 is largely removed by the first thinning wall surface 6b, and therefore, there is a concern that the strength or the rigidity may be damaged. However, in the present embodiment, the strength or the rigidity of the drill main body 1 is sufficiently secured while the smooth discharging of the chips is reliably maintained, and it is possible to prevent damages or the like.

Figure 3:
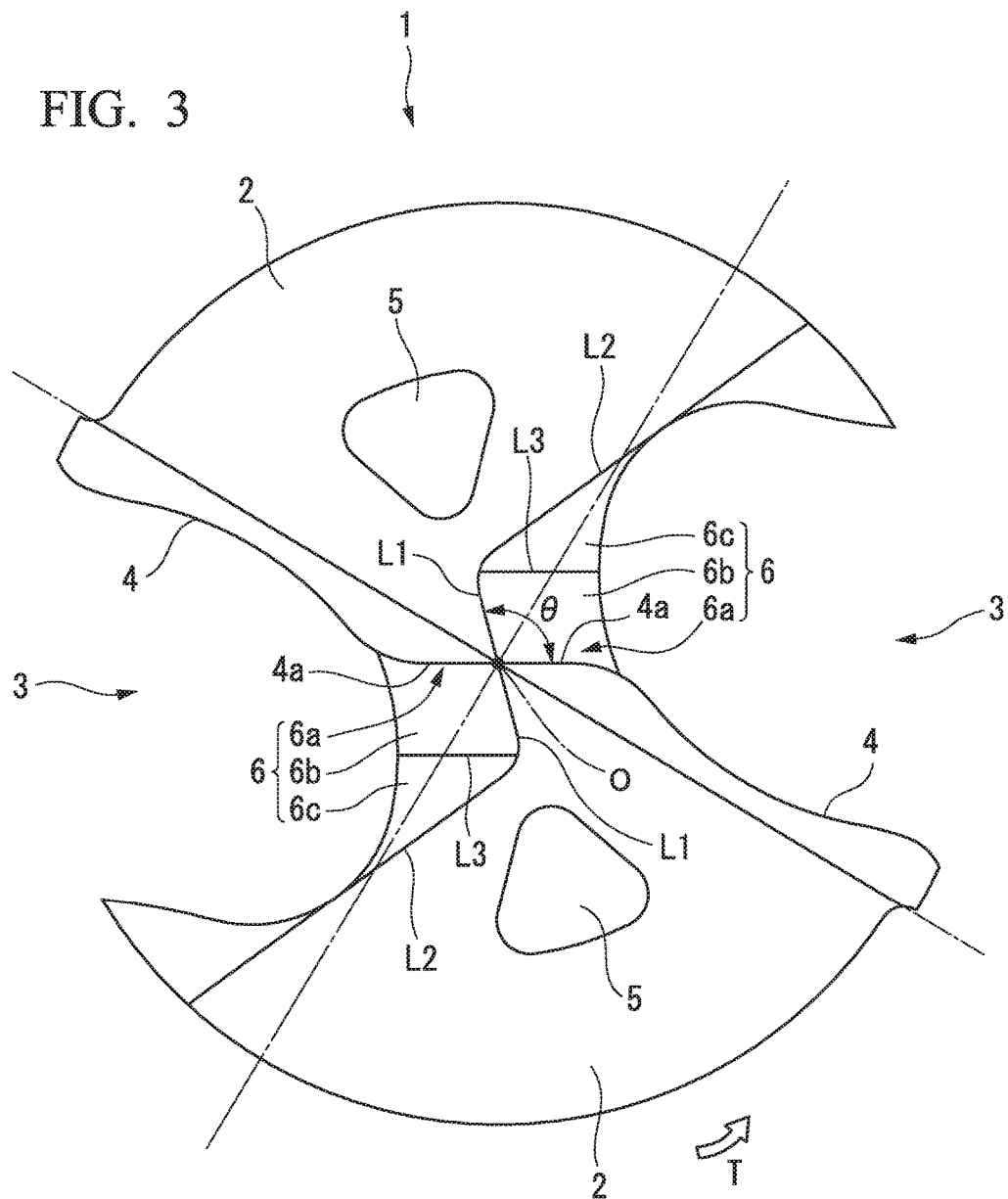
FIG. 3 is a front view as the drill main body showing the first embodiment of the present invention is viewed from the front end side in the direction of the axis.
Figure 4:
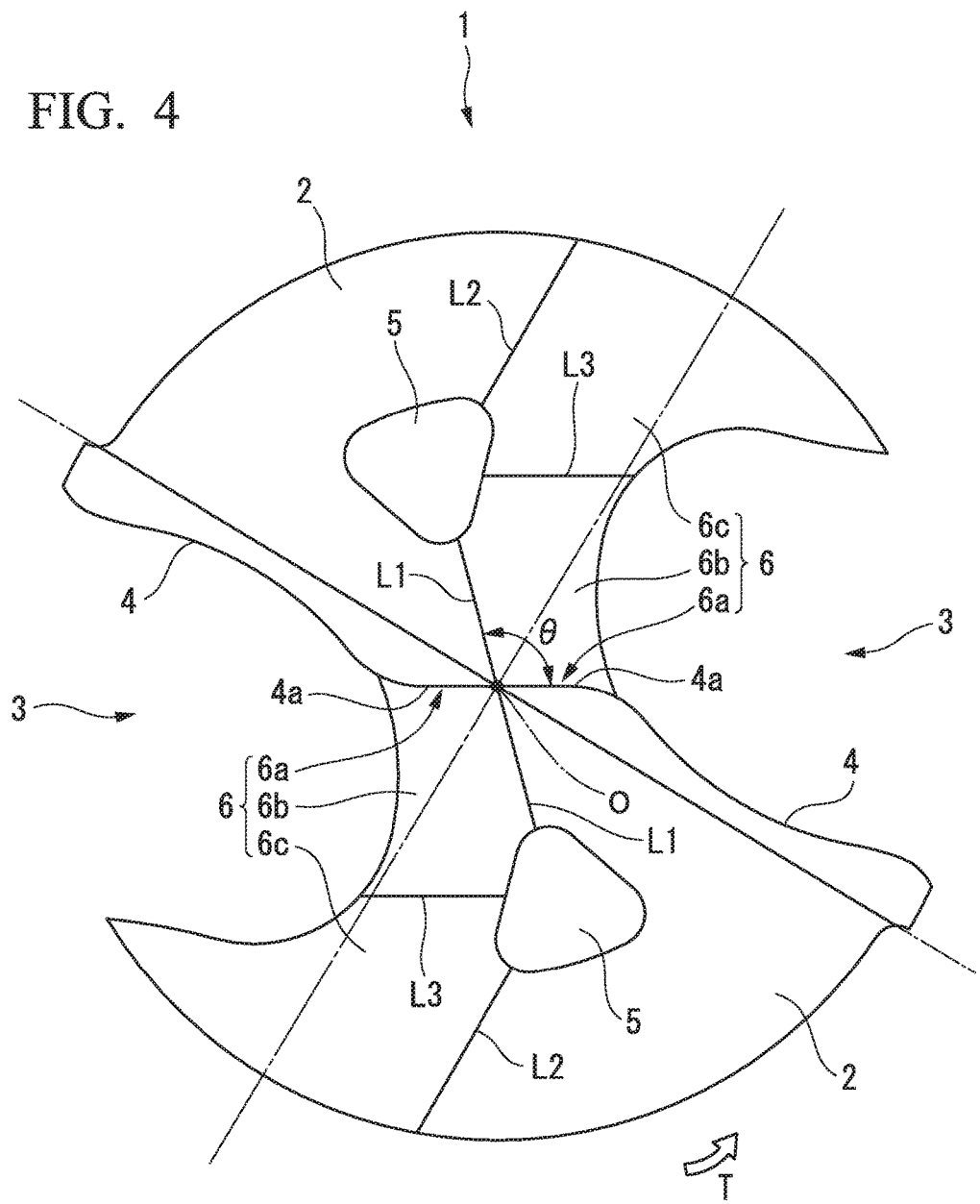
FIG. 4 is a front view as the drill main body showing the first embodiment of the present invention is viewed from the front end side in the direction of the axis.

Next, FIGS. 3 and 4 respectively show the second embodiments and the third embodiment of the present invention, and in FIGS. 3 and 4, the same reference numerals are assigned to portions common to the first embodiment shown in FIGS. 1 and 2, and descriptions thereof are omitted. In the second embodiment shown in FIG. 3, the intersection angle α (not shown in FIG. 3) is smaller than that of the first embodiment, the area of the second thinning wall surface 6c is smaller than that of the first embodiment, and specifically, as viewed from a side of the front end in the direction of the axis O, the second thinning ridgeline L2 is formed to be in contact with a concave-shaped wall surface facing the side opposite to the chip discharge flute 3 in the drill rotation direction T. In the second embodiment, the portion removed from the front end portion the drill main body 1 by the thinning part 6 further decreases, and therefore, it is possible to further improve the strength or the rigidity. In addition, if the intersection angle α is smaller than that of the second embodiment, the second thinning wall surface 6c can be formed such that the second thinning wall surface 6c does not reach the outer peripheral surface (the second outer circumference body clearance surface) of the front end portion the drill main body 1, and therefore, it is possible to further improve the strength or the rigidity of the front end portion the drill main body 1.

Meanwhile, in the third embodiment shown in FIG. 4, contrary to the second embodiment, the thinning part 6 is formed to be larger than that of the first embodiment, and it is possible to more smoothly discharge the chips generated by the thinning edge 4a. Moreover, in the third embodiment, in order to increase the thinning part 6, the third thinning ridgeline L3 is formed to be positioned closer to the outer peripheral side of the front end portion the drill main body 1 than the position of the third thinning ridgeline L3 of the first embodiment, and accordingly, the first thinning ridgeline L1 extends toward the outer circumference side of the drill main body 1 and intersects the opening on the tip flank face 2 of the coolant hole 5. Moreover, in the third embodiment, the second and third thinning ridgelines L2 and L3 intersect the opening of the coolant hole 5.

Therefore, according to the third embodiment, the coolant discharged from the coolant hole 5 can be effectively supplied to the thinning part 6, and it is possible to improve lubricating effects or cooling effects of the cutting edge 4 including the thinning edge 4a or a cutting portion of a workpiece. Moreover, the coolant effectively supplied to the thinning part 6 is discharged through the chip discharge flute 3 together with the chips, and more favorable discharge properties of the chips can be obtained.

In order to merely improve the lubricating performed by the coolant and cooling effects or discharge properties of the chips, any one of the first and second thinning ridgelines L1 and L2 may intersect the opening of the coolant hole 5. Moreover, in order to merely increase the volume of the thinning part 6, the intersection angle θ may be increased, or the intersection angle α (not shown in FIG. 3) may be increased within a range exceeding the intersection angle θ. Moreover, the present invention can be applied to a drill which does not include the coolant holes 5 of the first to third embodiments.

INDUSTRIAL APPLICABILITY

As described above, according to the present invention, the strength or the rigidity of the front end portion the drill main body is maintained to lengthen the life span of the drill, and particularly, the chips generated by the thinning edge can be smoothly discharged, the cutting resistance decreases even in the high efficiency machining, stable drilling can be performed, and therefore, industrial applicability is obtained.

REFERENCE SIGNS LIST

1: Drill main body
2: Tip flank face
3: Chip discharge flute
4: Cutting edge
4a: Thinning edge
5: Coolant hole
6: Thinning part
6a: Thinning rake face
6b: First thinning wall surface
6c: Second thinning wall surface
O: Axis of drill main body 1
T: Drill rotation direction
L1: First thinning ridgeline
L2: Second thinning ridgeline
L3: Third thinning ridgeline
M1: Extension line of first thinning ridgeline L1 extending to outer peripheral side of drill main body 1
M2: Extension line of second thinning ridgeline L2 extending to inner peripheral side of drill main body 1
M3: Extension line of thinning edge 4a
N1: Concave curve line connecting thinning edge 4a and first thinning ridgeline L1 to each other
N2: Concave curve line connecting first and second thinning ridgeline L1 and L2 to each other
R1: Curvature radius of concave curve line N1
R2: Curvature radius of concave curve line N2 (curvature radius of concave surface connecting first and second thinning wall surface 6b and 6c to each other)
θ: Intersection angle between thinning edge 4a and first thinning ridgeline L1 when viewed from front end side in direction of axis O
α: Intersection angle between extension line of second thinning ridgeline L2 extending to inner peripheral side of drill main body 1 and extension line M3 of thinning edge 4a when viewed from front end side in direction of axis O

What is claimed is:
1. A drill comprising:
a drill main body configured to be rotated about an axis;
a chip discharge flute, which has an opening in a tip flank face of the drill main body and extends toward a rear end side of the drill main body, formed on an outer circumference of a front end portion of the drill main body; and a cutting edge formed on an intersection ridgeline between a wall surface of the chip discharge flute facing a drill rotation direction and the tip flank face, wherein a thinning rake face is formed in a front end inner peripheral portion of the wall surface facing the drill rotation direction of the chip discharge flute by a thinning part being formed in a front end inner peripheral portion of the chip discharge flute, and a thinning edge, which is an inner peripheral portion of the cutting edge, is formed on an intersection ridgeline between the thinning rake face and the tip flank face, a first thinning wall surface, which is connected to the thinning rake face and faces an outer circumference side of the drill main body, and a second thinning wall surface, which is connected to the first thinning wall surface and extends toward a heel side, are formed on a wall surface facing an opposite side of the drill rotation direction of the chip discharge flute, an intersection ridgeline between the first thinning wall surface and the tip flank face is a first thinning ridgeline, and an intersection ridgeline between the second thinning wall surface and the tip flank face is a second thinning ridgeline, as viewed from a side of the front end in a direction of the axis, an intersection angle between the thinning edge and the first thinning ridgeline is larger than 95°, and the second thinning ridgeline is bent to the opposite side of the drill rotation direction with respect to an extension line of the first thinning ridgeline toward the outer circumference side of the drill main body, and the thinning edge and the first thinning ridgeline are connected to each other via a concave curve line, the first thinning wall surface and the second thinning wall surface are connected to each other via a concave surface, and a curvature radius of the concave curve line is smaller than a curvature radius of the concave surface;

wherein as viewed from a side of the front end in the direction of the axis, a diameter of a circle, which is in contact with a third thinning ridgeline that is an intersection ridgeline of extension faces of the first thinning wall surface and the second thinning wall surface and has a center corresponding to a location of the axis, is within a range of 0.02×D to 0.6×D with respect to an outer diameter D of the cutting edge.

2. The drill according to claim 1, wherein an extension line of the second thinning ridgeline toward an inner peripheral side of the drill main body intersects an extension line of the thinning edge as viewed from a side of the front end in the direction of the axis.

3. The drill according to claim 2, wherein as viewed from a side of the front end in the direction of the axis, a diameter of a circle, which is in contact with a third thinning ridgeline that is an intersection ridgeline of extension faces of the first thinning wall surface and the second thinning wall surface and has a center corresponding to a location of the axis, is within a range of 0.02×D to 0.6×D with respect to an outer diameter D of the cutting edge.

4. The drill according to claim 3, wherein
a coolant hole has an opening on the tip flank face, and
at least one of the first thinning ridgeline and the second thinning ridgeline intersects the opening of the coolant hole.

5. The drill according to claim 2, wherein
a coolant hole has an opening on the tip flank face, and
at least one of the first thinning ridgeline and the second thinning ridgeline intersects the opening of the coolant hole.

6. The drill according to claim 1, wherein
a coolant hole has an opening on the tip flank face, and
at least one of the first thinning ridgeline and the second thinning ridgeline intersects the opening of the coolant hole.

7. The drill according to claim 1, wherein
a coolant hole has an opening on the tip flank face, and
at least one of the first thinning ridgeline and the second thinning ridgeline intersects the opening of the coolant hole.

* * * * *